United States Patent [19]

O'Hare

[11] 4,288,200

[45] Sep. 8, 1981

[54] WIND TOWER TURBINE

[76] Inventor: Louis R. O'Hare, 1041 Ponderosa Apt. 2, Fort Collins, Colo. 80521

[21] Appl. No.: 33,195

[22] Filed: Apr. 25, 1979

[51] Int. Cl.³ .............................................. F03D 3/04
[52] U.S. Cl. ...................................... 415/2 R; 416/9
[58] Field of Search ................................. 415/2 R–4; 416/9

[56] References Cited

U.S. PATENT DOCUMENTS

| | | | |
|---|---|---|---|
| 1,096,057 | 5/1914 | Rees | 415/2 |
| 1,674,169 | 6/1928 | Flettner | 416/4 |
| 1,808,874 | 6/1931 | Wilson | 415/2 |
| 1,810,113 | 6/1931 | Schlotzhauer | 415/2 |
| 1,812,741 | 6/1931 | Espinosa | 415/2 |
| 2,569,983 | 10/1951 | Favre | 416/4 |
| 3,895,882 | 7/1975 | Moyer | 415/2 |
| 3,970,409 | 7/1976 | Luchuk | 415/2 X |
| 4,084,918 | 4/1978 | Pavlecka | 415/2 X |
| 4,088,419 | 5/1978 | Hope | 415/2 |
| 4,156,580 | 5/1979 | Pohl | 415/2 |

FOREIGN PATENT DOCUMENTS

| | | | |
|---|---|---|---|
| 497835 | 12/1950 | Belgium | 415/4 |
| 821930 | of 1951 | Fed. Rep. of Germany | 415/2 |
| 575587 | 8/1924 | France | 415/2 |
| 900038 | 6/1945 | France | 415/2 |
| 973968 | 2/1951 | France | 415/60 |
| 977561 | 4/1951 | France | 416/121 A |
| 2286954 | 4/1976 | France | 416/197 A |

*Primary Examiner*—Everette A. Powell, Jr.

[57] ABSTRACT

A wind powered turbine drive for an electric generator is disclosed in which both the generator and the turbine driving it are stationary and remain in a fixed position irrespective of wind direction. This turbine facilitates electric power generation by wind power in those higher power ranges where the greater generator and turbine weights otherwise make it difficult and costly to support and to rotate the generator to face the driving wind because this present generator obviates the necessity of the generator's changing direction in that this present turbine receives wind energy from any direction by the use of a weather vane which weathercocks to rotate a wind inlet to the direction from which the wind is blowing and thereby exposes only the receding turbine blades to the force of the incoming wind.

2 Claims, 7 Drawing Figures

WIND TOWER TURBINE

This invention relates to those engines which convert the energy of a streaming fluid into rotational energy such as turbines, waterwheels, windmills, etc. But more specifically this invention relates to those engines as the particular type turbine and windmill which convert streaming fluid energy when the streaming fluid comes from changing directions. As an example, the windmill with a weather vane which weathercocks to a position downwind of the impeller blades and thereby faces the impeller blades into the wind is a type of multidirectional turbine using energy of a fluid streaming from changing directions. In this case, however, the windmill differs from the present invention in that the windmill's turbine and engine change direction and move and those of this invention do not.

In some respects therefore this present invention relates more to the mechanism of the anamometer although the anamometer is not used for converting large energies to rotary motion. The anamometer does convert streaming energy from changing directions to rotary motion and it can do this without mechanisms to change the turbine's or engine's position or direction since it can register wind velocity without changing its direction to the wind.

Accordingly, an object of this invention is the provision of an engine to convert the energy of a streaming fluid such as wind energy into rotary energy and to do this when said fluid streams from different directions at different times.

Another object is to perform this conversion in terms of relatively large amounts of energy in as simple a way as is possible and with a minimum of construction costs and materials. Accordingly this object is to obviate the heavy, costly and carefully ballanced equipment required to constantly change direction of a heavy generator and turbine.

Another object is the provision of a device which will perform the above mentioned energy conversion with a minimum of waiste of incident energy and space. In short the composite object of this invention is to provide a turbine type drive for an electric generator as simple in principle as an anamometer while reducing the inefficiency of the anamometer configuration in order to use the general anamometer configuration for large energy production from the wind and other directionally changing streaming fluids.

The most specific object of my present invention is the correlation and co-application of the multidirectional energy receiving characteristics of the anamometer mechanism with a means of greatly reducing the energy waisted when a rotating member temporarily moves in a direction that opposes the direction of the streaming fluid (during that part of its rotation while it is not moving in the direction in which the fluid is moving).

What I have invented therefore is a multi-blade turbine able to efficiently receive energy from fluid streaming to it from any of 360 degrees by a positioning of the fluid inlet port which positioning is effected by the movement of a weather vane in that said weather vane weathercocks and rotates to a most downstream position and in so doing moves an attached shield to obstruct that portion of the streaming fluid which would otherwise impinge those impeller blades which are temporarily moving in a direction counter to said fluid's direction.

In one embodiment of the basic inventive concept long verticle plates rectangular in shape are attached along their length at a long verticle, rotable shaft connected to a generator. One plate is bowed inward and appears concave to the approaching wind. The plate on the opposite side of the shaft is bowed along the center of its length with the bow crest extending into the wind and appearing convex to the approaching wind. The concave plate offering more aerodynamic resistance to the wind will receed with the wind for 180 degrees until its back side rotates into the windstream at which time it appears convex to the windfront and looses some of its wind resistance and is thereby able to advance into the wind since the blade on the opposite side of the shaft by rotating 180° becomes concave to the windfront and consequently recedes with the wind for another 180° to complete a full cycle of rotary motion which continues as the first mentioned blade is again in its original position.

In another embodiment a shield at least the width of the turbine blade positioned on the side of the shaft on which tubine blades advance into the wind reduces the wind pressure which impedes the motion of blades in that part of their cycle and slows rotary motion. By placing a shield in front of the blades advancing against the wind's energy the loss of work required to cause this advance is greatly diminished and the turbine becomes more efficient. Since there is a shield in front of the advancing blades the open area before the impelled blades is called the inlet port. In this embodiment the inlet port and the shield are rotated by being freely suspended on the shaft by bearings. They are rotated by means of a weather vane which pivots them on the shaft so that when the weather vane is downstream the sheild is in front of those blades advancing into the wind.

Other embodiments and mechanisms will become evident by referring now to the accompanying drawings.

FIG. 1 of the drawings shows the basic rotating mechanism capable of being driven by streaming fluid from any of 360 degrees without changing its direction.

Figure 1:
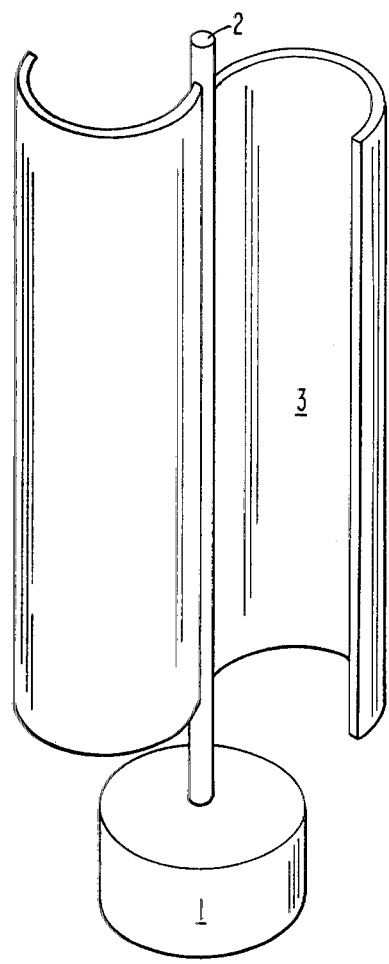

Referring then to FIG. 1, generator 1 is driven by its long armature shaft 2 which is rotated by turbine blades 3, and 4. When the wind is in a direction toward the page then blade 3 receeds in a direction into the page and 4 advances toward the viewer and counter to the wind. (This counter wind movement of 4 at this time detracts from the useful energy output of the system and makes for inefficiency.)

Figure 2:
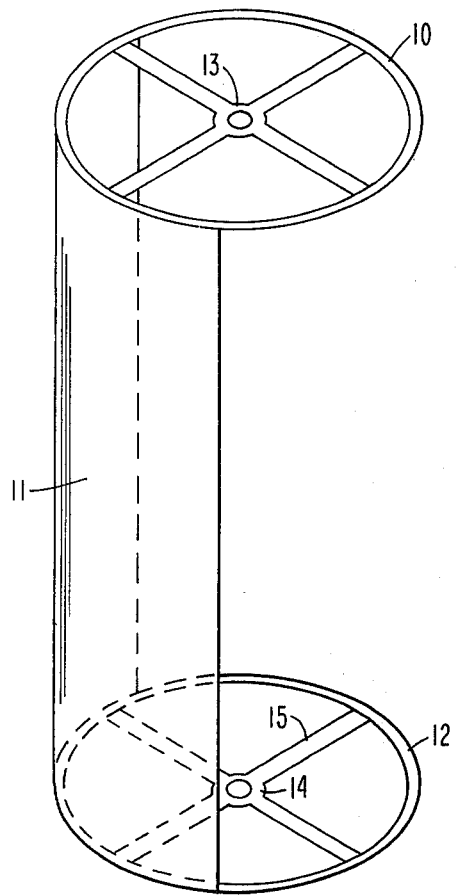
FIG. 2 shows a shield which may be rotated by suitable bearings to obstruct and impede the wind from striking those impeller blades moving counter to wind direction.

Referring to FIG. 2, the cylindrical shield 11 is a part of cylinder's circumference in area and supported by bracing hoops 10 and 12 from which arms 15 extend to bearings 13 and 14 whereby the shield is held in front of the advancing blade and whereby the shield may rotate as the wind direction changes.

Figure 3:
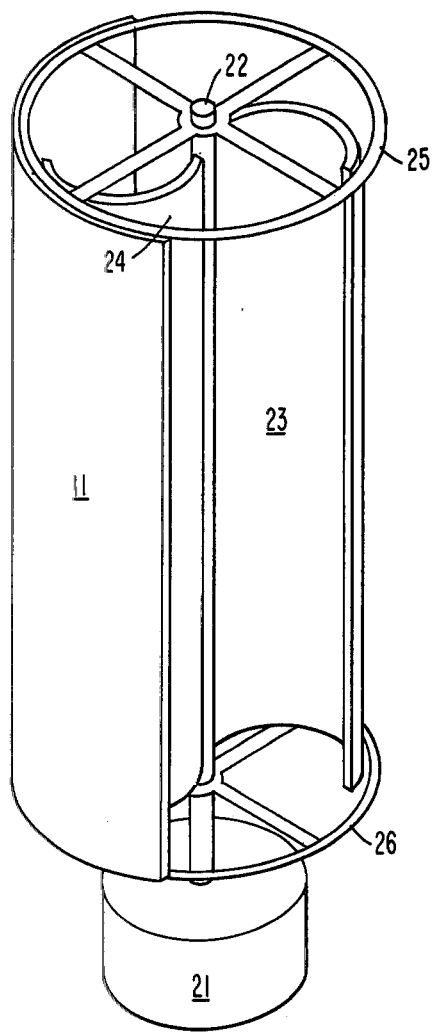
FIG. 3 shows a shield placed on the turbine.

Referring to FIG. 3, the shield 11 of FIG. 2 is shown here in position over the turbine as it would be if the wind were coming from a direction toward the page. Turbine blades 23 and 24 drive generator 21 by means of shaft 22.

Figure 4:
FIG. 4 shows a top view looking down on the turbine blades. It also shows a cylindrical shield and a weather vane to rotate the shield without changing the plane of rotation of the turbine blades.
Figure 4:
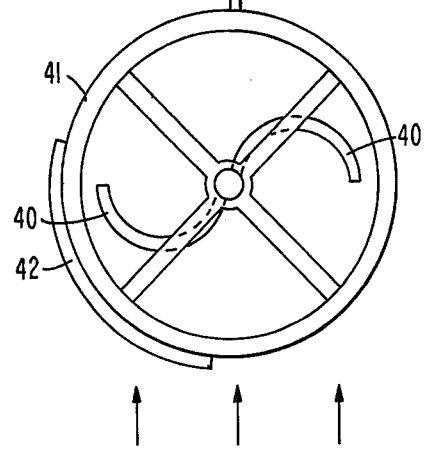

Next in FIG. 4, turbine blades 40 are seen from the top view as well as the hoop 41 that supports the shield 42 and weather vane 43 that periodically pivots the shield 42 into a new correct position as the wind changes.

Figure 5:
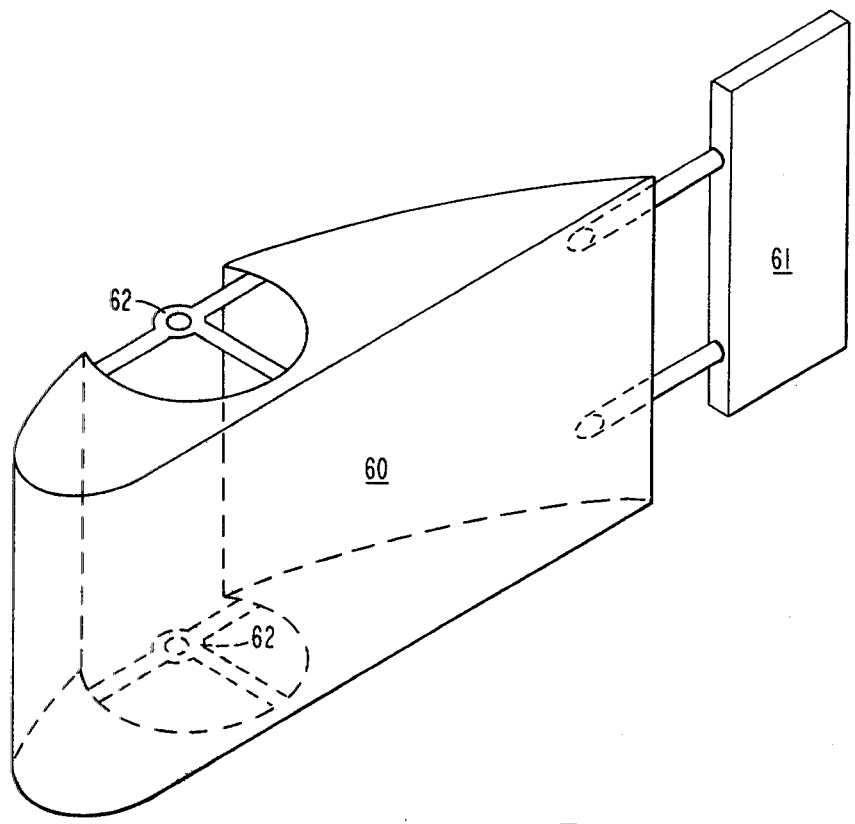
FIG. 5 shows a more effective shield in the form of an airfoil which not only provides the shielding function but also accelerates the wind producing higher speed impact air against the turbine blades.

In the next drawing FIG. 5, a three dimensional drawing of an airfoil shield 60 is shown which serves the same purpose of 11 of FIG. 2 and 42 of FIG. 4. This shield 60 is pivoted into the wind by weather vane 61 and rotates on bearings 62.

Figure 6:
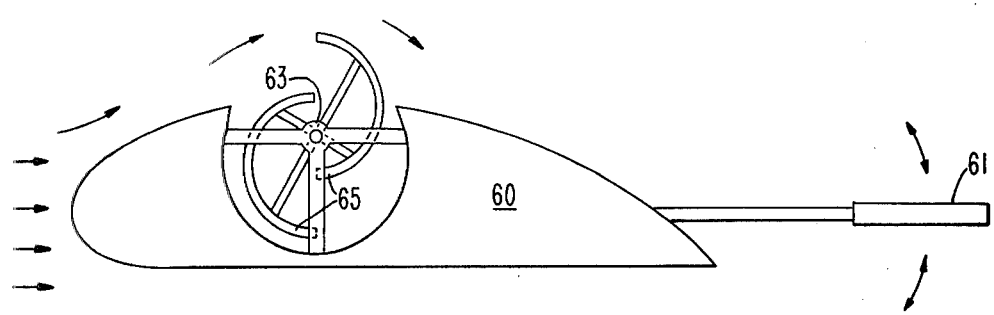
FIG. 6 shows a top view of the airfoil shield with a weather vane to keep the shield in the correct position confronting a changing wind without requireing the turbine blades to change their plane of rotation.

Referring then to FIG. 6, which is a top view of airfoil-shield 60 which is the same as airfoil-shield of FIG. 5, weather vane 61 rotates the shield inti its correct position whenever the wind changes. (The bearings which support this airfoil for periodic pivoting into the wind and which turn on shaft 63 are not shown.) Similarily, the bearings and braces which are separate and distinct from the shields bearings and which support turbine blades 65 on shaft 63 are not shown in order to show the primary elements more clearly.

Figure 7:
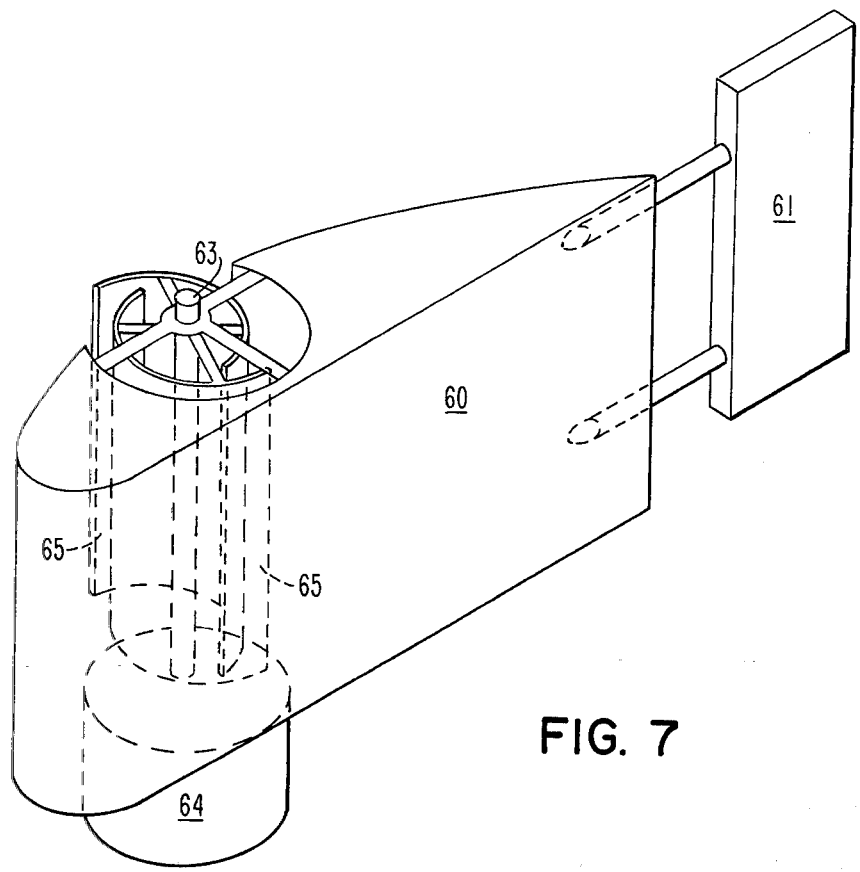
FIG. 7 is a side view of the airfoil-shield showing its relative position to the generator.

In FIG. 7 a side view shows airfoil-shield 60 pivoting on shaft 63 but not rotating at the same rpm as the shaft and the turbine blades 65 which drive the shaft. Generator 64 is driven by shaft 63. The weather vane 61 pivots the shield into the correct when wind direction changes. In these drawings the weather vane is shown with a direct connection, but a small weather vane on a separate mounting may be used to direct servomotors to rotate the shield as is generally practiced in the state of the art of remote control by using either a d.c. selsyn system with an amplifier to drive a reversible motor that turns the shield to the position indicated by the small weather vane. Similarly, magnesyn or autosyn or syncrosyn systems may be employed to drive motors which rotate the shield to its proper position.

I claim:
1. A wind driven turbine comprising:
(1) a wind energy to rotary motion conversion means in the form of impeller blades so formed with regard to curvature that wind striking the concave side of the curvature interacts with the blade to tend to move it more than it tends to move it in striking the opposite convex side and said blades being so positioned on and attached to a rotating member means such as a shaft, said shaft being vertically disposed and supported by thrust bearings in a base structure that is in the form of a housing capable of containing an energy extraction means such as a generator, said rotating member means being caused to rotate in a horizontal plane of rotation paralell to the plane of the wind's movement such that for each blade that is impelled to move in the direction of the wind another blade fastened to the opposite side of the rotatable member is caused to move counter to the wind thereby causing said shaft to rotate and,

(2) a single convex airfoil wind shielding and wind accelerating means rotable about the same axis as the axis about which the turbine impellers rotate and rotably secured to said verticle shaft by means of support bearings both above and below the rotable impeller means and said wind accelerator means being pivotable on said support bearings, the length of the leading edge of said convex airfoil extending vertically and said convex airfoil having within it an approximately cylindrical cavity the length of which cavity is vertically disposed with said cavity being of sufficient diameter to enclose the rotating impeller blades except at approximately that area on the surface of the convex curvature of the airfoil where the cord of the airfoil reaches maximum thickness, said cylindrical cavity in that area opening through the airfoil's convex surface to permit rotating blades to move outside the cavity for a portion of the arc of each rotation and said airfoil being of such a shape that it has a convex leading edge and sides at least one of which is convex with a lengthwise verticle opening to an internal cylindrical cavity, said airfoil also having a tapered trailing edge to which are attached support tubes to hold, (3) wind shield-accelerator directing means in the form of a weathervane which is a flat rectangular plate with its length extending vertically and capable of interacting with the relative wind to position the airfoil's leading edge to confront the approaching wind and, (4) energy extraction means whereby the energy imparted to the turbine blades is transmitted to an energy requireing unit such as a generator by means of attachment to the shaft in its base mounting.

2. An improvement in the rotable shielding of horizontally rotating wind turbines of the type that have a single rotor and cupped turbine blades receiving impact air on concave sides and shielded from approaching wind on their convex sides by means of shielding rotatable into position between the approaching wind and those blades moving countercurrent to the wind with said shielding being rotated into said position by a weathervane and with said shielding rotating about the same axis as the axis about which the turbine blades rotate, and said improvement being:

(1) a single convex airfoil windshielding and wind accelerating means, the cord of which airfoil is in a horizontal plane and the length of which airfoil extends vertically and is supported on bearings both above and below the horizontally rotable impeller means on the rotating member means that is a shaft positioned vertically and supported at its base by thrust bearings, and with said accelerator means being pivotable on its said support bearings and said convex airfoil having within it an approximately cylindrical cavity the length of which cavity is vertically disposed and of sufficient diameter to enclose the rotating impeller blades except at approximately that area on the surface of the convex curvature of the airfoil where the cord of the airfoil reaches maximum thickness with said cylindrical cavity in that area opening through the airfoil's convex surface to permit said rotating impellers to move outside the cavity for a portion of the arc of each rotation and said airfoil being of such a shape that it has a convex leading edge and sides at least one of which is convex with a lengthwise verticle opening to the internal cylindrical cavity, said airfoil also having a tapered trailing edge to which are attached support tubes to hold a windshield accelerator directing means in the form of a windvane which is a rectangular plate the length of which extends vertically and the width of which extends rearward and downstream away from the airfoil's trailing edge.

* * * * *